US008635065B2

(12) United States Patent
Goronzy-Thomae et al.

(10) Patent No.: US 8,635,065 B2
(45) Date of Patent: Jan. 21, 2014

(54) APPARATUS AND METHOD FOR AUTOMATIC EXTRACTION OF IMPORTANT EVENTS IN AUDIO SIGNALS

(75) Inventors: Silke Goronzy-Thomae, Fellbach-Schmiden (DE); Thomas Kemp, Esslingen (DE); Ralf Kompe, Rottenbach (DE); Yin Hay Lam, Stuttgart (DE); Krzysztof Marasek, Warszawa (PL); Raquel Tato, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1720 days.

(21) Appl. No.: 10/985,446

(22) Filed: Nov. 10, 2004

(65) Prior Publication Data

US 2005/0102135 A1 May 12, 2005

(30) Foreign Application Priority Data

Nov. 12, 2003 (EP) .................................... 03026049

(51) Int. Cl.
| | |
|---|---|
| G10L 15/06 | (2013.01) |
| G10L 21/00 | (2013.01) |
| G10L 19/12 | (2013.01) |
| G10L 19/14 | (2006.01) |
| G10L 17/00 | (2013.01) |

(52) U.S. Cl.
USPC ........... 704/245; 704/213; 704/214; 704/268; 704/270; 704/270.1; 704/275; 704/225; 704/223; 704/201; 704/243; 704/248

(58) Field of Classification Search
USPC ......... 704/213, 214, 245, 268, 270, 225, 223, 704/201, 243, 248, 275, 270.1
See application file for complete search history.

(56) References Cited

U.S. PATENT DOCUMENTS 5,731,844 A * 3/1998 Rauch et al. .................... 725/40

5,754,939 A * 5/1998 Herz et al. ................... 455/3.04

(Continued)

FOREIGN PATENT DOCUMENTS

EP   1 300 831   4/2003

OTHER PUBLICATIONS

M. Liu and C. Wan. A Study of Content-Based Classification and Retrieval of Audio Database. In Proc. Int. Database Engineering and Applications Symposium (IDEAS), Grenoble, France, 2001. IEEE.*

(Continued)

Primary Examiner — Edgar Guerra-Erazo
(74) Attorney, Agent, or Firm — Oblon, Spivak, McClelland, Maier & Neustadt, L.L.P.

(57) ABSTRACT

The present invention discloses an apparatus for automatic extraction of important events in audio signals comprising:
signal input means for supplying audio signals;
audio signal fragmenting means for partitioning audio signals supplied by the signal input means into audio fragments of a predetermined length and for allocating a sequence of one or more audio fragments to a respective audio window;
feature extracting means for analyzing acoustic characteristics of the audio signals comprised in the audio fragments and for analyzing acoustic characteristics of the audio signals comprised in the audio windows; and
important event extraction means for extracting important events in audio signals supplied by the audio signal fragmenting means based on predetermined important event classifying rules depending on acoustic characteristics of the audio signals comprised in the audio fragments and on acoustic characteristics of the audio signals comprised in the audio windows, wherein each important event extracted by the important event extraction means comprises a discrete sequence of cohesive audio fragments corresponding to an important event included in the audio signals.

28 Claims, 4 Drawing Sheets

(56) References Cited

U.S. PATENT DOCUMENTS

| | | | | |
|---|---|---|---|---|
| 5,758,259 | A * | 5/1998 | Lawler | 725/45 |
| 5,798,785 | A * | 8/1998 | Hendricks et al. | 725/46 |
| 5,912,696 | A * | 6/1999 | Buehl | 725/28 |
| 5,970,447 | A * | 10/1999 | Ireton | 704/233 |
| 6,020,883 | A * | 2/2000 | Herz et al. | 715/721 |
| 6,038,367 | A * | 3/2000 | Abecassis | 386/262 |
| 6,177,931 | B1 * | 1/2001 | Alexander et al. | 725/52 |
| 6,185,527 | B1 * | 2/2001 | Petkovic et al. | 704/231 |
| 6,195,661 | B1 * | 2/2001 | Filepp et al. | 1/1 |
| 6,199,076 | B1 * | 3/2001 | Logan et al. | 715/203 |
| 6,236,395 | B1 * | 5/2001 | Sezan et al. | 715/723 |
| 6,268,849 | B1 * | 7/2001 | Boyer et al. | 725/40 |
| 6,295,092 | B1 * | 9/2001 | Hullinger et al. | 348/468 |
| 6,345,252 | B1 * | 2/2002 | Beigi et al. | 704/272 |
| 6,404,925 | B1 * | 6/2002 | Foote et al. | 382/224 |
| 6,476,308 | B1 * | 11/2002 | Zhang | 84/616 |
| 6,570,991 | B1 * | 5/2003 | Scheirer et al. | 381/110 |
| 6,654,721 | B2 * | 11/2003 | Handelman | 704/270 |
| 6,710,822 | B1 * | 3/2004 | Walker et al. | 348/722 |
| 6,714,910 | B1 * | 3/2004 | Rose et al. | 704/256 |
| 6,928,407 | B2 * | 8/2005 | Ponceleon et al. | 704/253 |
| 6,996,171 | B1 * | 2/2006 | Walker et al. | 375/240.09 |
| 7,051,352 | B1 * | 5/2006 | Schaffer | 725/39 |
| 7,096,486 | B1 * | 8/2006 | Ukai et al. | 725/58 |
| 7,277,537 | B2 * | 10/2007 | Li | 379/386 |
| 7,370,276 | B2 * | 5/2008 | Willis | 715/747 |
| 7,454,331 | B2 * | 11/2008 | Vinton et al. | 704/225 |
| 7,533,399 | B2 * | 5/2009 | Ma et al. | 725/46 |
| 7,581,237 | B1 * | 8/2009 | Kurapati | 725/46 |
| 7,600,244 | B2 * | 10/2009 | Maruyama et al. | 725/47 |
| 7,716,704 | B2 * | 5/2010 | Wang et al. | 725/46 |
| 7,774,288 | B2 * | 8/2010 | Acharya et al. | 706/45 |
| 7,885,963 | B2 * | 2/2011 | Sanders | 707/750 |
| 7,962,330 | B2 * | 6/2011 | Goronzy et al. | 704/201 |
| 2001/0023401 | A1 * | 9/2001 | Weishut et al. | 705/1 |
| 2002/0093591 | A1 * | 7/2002 | Gong et al. | 348/515 |
| 2002/0133499 | A1 * | 9/2002 | Ward et al. | 707/102 |
| 2002/0157116 | A1 * | 10/2002 | Jasinschi | 725/136 |
| 2003/0007001 | A1 * | 1/2003 | Zimmerman | 345/716 |
| 2003/0093329 | A1 * | 5/2003 | Gutta | 705/26 |
| 2003/0093790 | A1 * | 5/2003 | Logan et al. | 725/38 |
| 2003/0097186 | A1 * | 5/2003 | Gutta et al. | 700/1 |
| 2003/0097196 | A1 * | 5/2003 | Gutta et al. | 700/100 |
| 2003/0101451 | A1 * | 5/2003 | Bentolila et al. | 725/34 |
| 2004/0070594 | A1 * | 4/2004 | Burke | 345/716 |
| 2004/0078188 | A1 * | 4/2004 | Gibbon et al. | 704/1 |
| 2004/0098376 | A1 * | 5/2004 | Li et al. | 707/3 |
| 2004/0158853 | A1 * | 8/2004 | Doi et al. | 725/38 |
| 2004/0201784 | A9 * | 10/2004 | Dagtas et al. | 348/738 |
| 2004/0210436 | A1 * | 10/2004 | Jiang et al. | 704/222 |
| 2005/0131688 | A1 * | 6/2005 | Goronzy et al. | 704/240 |
| 2005/0160449 | A1 * | 7/2005 | Goronzy et al. | 725/5 |
| 2005/0216260 | A1 * | 9/2005 | Ps et al. | 704/213 |
| 2006/0123448 | A1 * | 6/2006 | Ma et al. | 725/51 |
| 2006/0251385 | A1 * | 11/2006 | Hwang et al. | 386/54 |
| 2007/0216538 | A1 * | 9/2007 | Thelen et al. | 340/825.69 |
| 2007/0271287 | A1 * | 11/2007 | Acharya et al. | 707/101 |
| 2008/0140406 | A1 * | 6/2008 | Burazerovic et al. | 704/260 |

OTHER PUBLICATIONS

Nwe, T. L.; Wei, F. S. & Silva, L. C. D. (2001). Speech based emotion classification, In IEEE Region 10 International Conference on Electrical Electronic Technology, vol. 1, pp. 297-330.*

T. Zhang and C. C. J. Kuo. Audio-guided audiovisual data segmentation and indexing. In Conference on Storage and Retrieval for Image and Video Databases VU, SPIE, vol. 3656, pp. 316-327, San Jose, 1999.*

Kieron Messer, William Christmas, and Josef Kitfler, "Automatic Sports Classification", University of Surrey, Guildford GU2 7XH. Uk., pp. 1005-1008.*

Kemp T et al: "Strategies for automatic segmentation of audio data" Proceedings of 2000 International Conference on Acoustics, Speech and Signal Processing, vol. 3, Jun. 5, 2000, Jun. 9, 2000, pp. 1423-1426, IEEE.*

Tjondronegoro, D., Chen, Y. P., and Pham, B. 2003. Sports video summarization using highlights and play-breaks. In Proceedings of the 5th ACM SIGMM international Workshop on Multimedia information Retrieval (Berkeley, California, Nov. 07-07, 2003). MIR '03. ACM, New York, NY, 201-208.*

W. Zhou, S. Dao, and C.-C. Jay Kuo, On-Line Knowledge- and Rule-Based Video Classification System for Video Indexing and Dissemination,Information Systems, vol. 27, No. 8, 2002, pp. 559-586.*

U.S. Appl. No. 12/369,352, filed Feb. 11, 2009, Kemp.

Lawrence R. Rabiner, "A Tutorial on Hidden Markov Models and Selected Applications in Speech Recognition", Proceedings of the IEEE, vol. 77, No. 2, Feb. 1989, pp. 257-286.

Hadi Harb, et al. "Speech/ Music/ Silence and Gender Detection Algorithm" 6 pages.

Zhu Liu, et al. "Audio Feature Extraction and Analysis for Scene Segmentation and Classification" pp. 1-39.

Don Kimber, et al. "Acoustic Segmentation for Audio Browsers" 10 pages.

George Tzanetakis, et al. "MARSYAS: A framework for audio analysis" pp. 1-13 and 2 cover pages.

C. M. Lee, et al. "Recognition of Negative Emotions from the Speech Signal" 4 pages.

Valery A. Petrushin, "Emotion in Speech: Recognition and Application to Call Centers" 1999 Conference on Artificial Neural Networks in Engineering, 8 pages.

Keiichi Tokuda, et al. "Recursive Calculation of Mel-Cepstrum from LP Coefficients" Apr. 1, 1994, pp. 1-7.

* cited by examiner

APPARATUS AND METHOD FOR AUTOMATIC EXTRACTION OF IMPORTANT EVENTS IN AUDIO SIGNALS

The present invention relates to an apparatus and a method for automatic extraction of important events in audio signals comprising the combination of features of independent claims 1 and 13, respectively.

Furthermore, the present invention relates to a method for automatic generation of important event classifying rules for extraction of important events in audio signals comprising the combination of features of independent claim 21.

There is a growing amount of video data available on the Internet and in a variety of storage media e.g. digital video discs. Furthermore, said video data is provided by a huge number of telestations as an analogue or digital video signal.

In general, a video signal is a rich information source containing speech, audio, text, colour patterns and shape of imaged objects and motion of these objects.

Currently, there is a desire for the possibility to search for segments of interest/important events (e.g. certain topics, persons, events or plots etc.) in said video signal.

In principle, any video signal can be primarily classified with respect to its general subject matter. The general subject matter frequently is referred to as "category".

If the video signal is a TV-broadcast, said general subject matter (category) might be news or sports or movie or documentary film, for example.

In the present document, a self-contained video signal belonging to one general subject matter (category) is referred to as "programme".

For example, each single telecast, each single feature film, each single newsmagazine and each single radio drama is referred to as programme.

Usually each programme contains a plurality of self-contained activities (events). In this regard, only self-contained activities (events) having a certain minimum importance (important events) are accounted for.

If the general subject matter (category) is news and the programme is a certain newsmagazine, for example, the self-contained activities/important events might be the different notices mentioned in said newsmagazine. If the general subject matter (category) is sports and the programme is a certain football match, for example, said self-contained activities/important events might be kick-off, penalty kick, throw-in etc.

In the following, said self-contained activities (events) that are included in a certain programme and meet a minimum importance are called "important events" or "contents".

Thus, each video signal firstly is classified with respect to its category (general subject matter).

Within each category the video signal is classified with respect to its programme (self-contained video signal belonging to one category).

The programmes are further classified with respect to its respective important events/contents (self-contained activities meeting minimum importance).

The traditional video tape recorder sample playback mode for browsing and skimming an analogue video signal is cumbersome and inflexible. The reason for this problem is that the video signal is treated as a linear block of samples. No searching functionality (except fast forward and fast reverse) is provided.

To address this problem some modern video tape recorder offer the possibility to set indexes either manually or automatically each time a recording operation is started to allow automatic recognition of certain sequences of video signals. It is a disadvantage with said indexes that the indexes are not adapted to individually identify a certain sequence of video signals.

On the other hand, digital video discs contain video data (digitised video signals), wherein chapters are added to the video data during the production of the digital video disc. Said chapters normally allow identification of the story line, only. Especially, said chapters do not allow identification of certain important events/contents (self-contained activities/events having a certain minimum importance) contained in the video data.

Moreover, during the last years electronic program guide (EPG) systems have been developed.

An electronic program guide (EPG) is an application used with digital set-top-boxes and newer television sets to list current and scheduled programs that are or will be available on each channel and a short summary or commentary for each program. EPG is the electronic equivalent of a printed television programme guide.

Usually, an EPG is accessed using a remote control device. Menus are provided that allow the user to view a list of programmes scheduled for the next few hours up to the next seven days. A typical EPG includes options to set parental controls, order pay-per-view programming, search for programmes based on theme or category, and set up a VCR to record programmes. Each digital television (DTV) provider offers its own user interface and content for its EPG. Up to know the format of the EPG is highly depending on the respective provider. The standards developed so far (e.g. the MHP-standard) still are not yet enforced.

Thus, video data suitable for EPG usually is composed of an audio signal, a picture signal and an information signal. Although EPG allows identification of programmes and of the general subject matter (category) a respective programme belongs to, EPG does not allow identification of certain important events included in the respective programmes.

It is a disadvantage with EPG that the information provided by the EPG still has to be generated manually by the provider of the EPG. As said before, this is very sumptuously and thus costly. Furthermore, typical EPG information comprises information about the content of a film as a whole, only. A further subdivision of the respective film into individual important events/contents (self-contained activities/plots) is not provided.

An obvious solution for the problem of handling large amounts of video signals would be to manually segment the video signals of each programme into segments according to its important events and to provide detailed information with respect to the video signal included in said segments.

Due to the immense amount of video sequences comprised in the available video signals, manual segmentation is extremely time-consuming and thus expensive. Therefore, this approach is not practicable to process a huge amount of video signals.

To solve the above problem approaches for automatic segmentation of video signals with respect to important events/contents comprised in the video signals have been recently proposed.

Possible application areas for such an automatic segmentation of video signals are digital video libraries or the Internet, for example.

Since video signals are composed of at least a picture signal and one or several audio signals an automatic video segmentation process could either rely on an analysis of the picture signal or the audio signals or on both.

In the following, a segmentation process that is focused on analysis of the audio signal contained in a video signal is further discussed.

It is evident that this approach is not limited to the audio signal contained in a video signal but might be used for any kind of audio signals except physical noise. Furthermore, the general considerations can be applied to other types of signals, e.g. analysis of the picture signal of video signals, too.

The known approaches for the segmentation process comprise clipping, automatic classification and automatic segmentation of the audio signals contained in the video signals.

"Clipping" is performed to partition the audio signals (and corresponding video signals) into audio clips (and corresponding video clips) of a suitable length for further processing. The audio clips comprise a suitable amount of audio signals, each. Thus, the accuracy of the segmentation process is depending on the length of said audio clips.

"Classification" stands for a raw discrimination of the audio signals with respect to the origin of the audio signals (e.g. speech, music, noise, silence and gender of speaker). Classification usually is performed by signal analysis techniques based on audio class classifying rules. Thus, classification results in a sequence of audio signals, which are partitioned with respect to the origin of the audio signals.

"Segmentation" stands for segmenting the audio signals (video signals) into individual sequences of cohesive audio clips wherein each sequence contains an important event (self-contained activity of a minimum importance) included in the audio signals (video signals) of said sequence. Segmentation can be performed based on important event classifying rules. In the technical field of segmentation, said important events frequently are referred to as "contents".

Each important event/content comprises all the audio clips which belong to the respective self-contained activity comprised in the audio signal (e.g. a goal, a penalty kick of a football match or different news during a news magazine).

Figure 4:
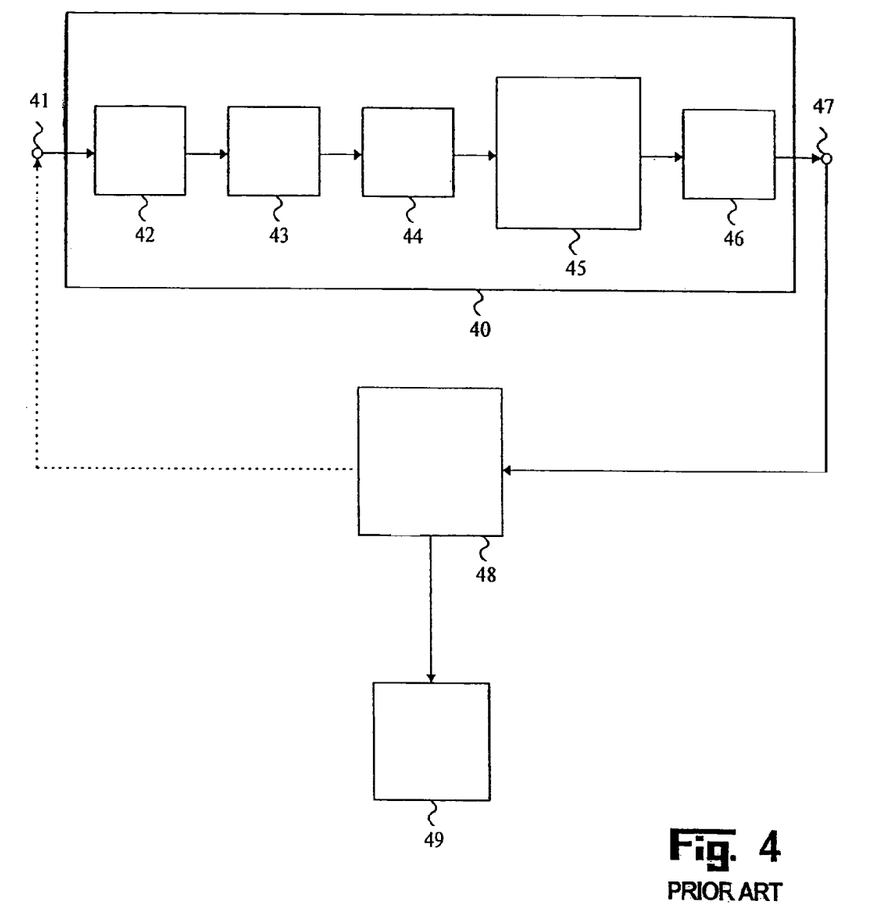
FIG. 4 shows a block diagram of a segmentation apparatus according to the prior art.

A segmentation apparatus 40 for automatic segmentation of audio signals according to the prior art is shown in FIG. 4.

Figure 5:
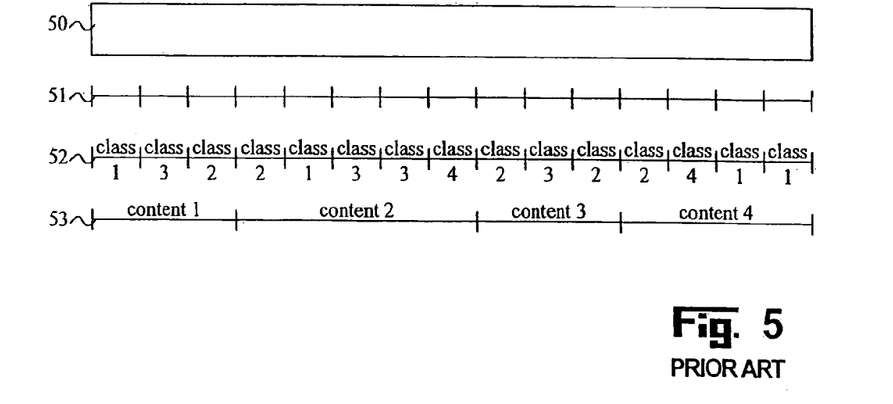
FIG. 5 schematically shows the effect the segmentation apparatus according to the prior art has on audio signals.

The effect of said segmentation apparatus 40 on an audio signal 50 is shown in FIG. 5.

The segmentation apparatus 40 comprises audio signal input means 42 for supplying a raw audio signal 50 via an audio signal entry port 41.

In the present example, said raw audio signal 50 is part of a video signal stored in a suitable video format in a hard disc 48.

Alternatively, said raw audio signal might be a real time signal (e.g. an audio signal of a conventional television channel), for example.

The audio signals 50 supplied by the audio signal input means 42 are transmitted to audio signal clipping means 43. The audio signal clipping means 43 partition the audio signals 50 (and the respective video signals) into audio clips 51 (and corresponding video clips) of a predetermined length.

The audio clips 51 generated by the audio signal clipping means 43 are further transmitted to class discrimination means 44.

The class discrimination means 44 discriminates the audio clips 51 into predetermined audio classes 52 based on predetermined audio class classifying rules by analysing acoustic characteristics of the audio signal 50 comprised in the audio clips 51, whereby each audio class identifies a kind of audio signals included in the respective audio clip.

Each of the audio class classifying rules allocates a combination of certain acoustic characteristics of an audio signal to a certain kind of audio signal.

Here, the acoustic characteristics for the audio class classifying rule identifying the kind of audio signals "silence" are "low energy level" and "low zero cross rate" of the audio signal comprised in the respective audio clip, for example.

In the present example an audio class and a corresponding audio class classifying rule for each silence (class 1), speech (class 2), cheering/clapping (class 3) and music (class 4) are provided.

Said audio class classifying rules are stored in the class discrimination means 44.

The audio clips 52 discriminated into audio classes by the class discrimination means 44 are supplied to segmenting means 45.

A plurality of predetermined content classifying rules is stored in the segmenting means 45. Each content classifying rule allocates a certain sequence of audio classes of consecutive audio clips to a certain content/important event.

In the present example a content classifying rule for each a "free kick" (content 1), a "goal" (content 2), a "foul" (content 3) and "end of game" (content 4) are provided.

It is evident that the contents comprised in the audio signals are composed of a sequence of consecutive audio clips, each. This is shown by element 53 of FIG. 5.

Since each audio clip can be discriminated into an audio class each content/important event comprised in the audio signals is composed of a sequence of corresponding audio classes of consecutive audio clips, too.

Therefore, by comparing a certain sequence of audio classes of consecutive audio clips that belongs to the audio signals with the sequences of audio classes of consecutive audio clips that belong to the content classifying rules the segmenting means 45 detects a rule, which meets the respective sequence of audio classes.

In consequence, the content allocated to said rule is allocated to the respective sequence of consecutive audio clips, which belongs to the audio signals.

Thus, based on said content classifying rules the segmenting means 45 segments the classified audio signals provided by the discrimination means 44 into a sequence of contents 53 (self-contained activities).

In the present example, an output file generation means 46 is used to generate a video output file containing the audio signals 50, the corresponding video signals and information regarding the corresponding sequence of contents 53.

Said output file is stored via a signal output port 47 into a hard disc 48.

By using a video playback apparatus 49 the video output files stored in the hard disc 48 can be played back.

In the present example, the video playback apparatus 49 is a digital video recorder which is further capable to extract or select individual contents comprised in the video output file based on the information regarding the sequence of contents 53 comprised in the video output file.

Thus, segmentation of audio signals with respect to its contents/important events is performed by the segmentation apparatus 40 shown in FIG. 4.

A stochastic signal model frequently used with classification of audio data is the HIDDEN MARKOV MODEL, which is explained in detail in the essay "A Tutorial on Hidden Markov Models and Selected Applications in Speech Recognition" by Lawrence R. RABINER published in the Proceedings of the IEEE, Vol. 77, No. 2, February 1989.

Different approaches for audio-classification-segmentation with respect to speech, music, silence and gender are disclosed in the paper "Speech/Music/Silence and Gender Detection Algorithm" of Hadi HARB, Liming CHEN and Jean-Yves AULOGE published by the Lab. ICTT Dept.

Mathematiques—Informatiques, ECOLE CENTRALE DE LYON. 36, avenue Guy de Collongue B. P. 163, 69131 ECULLY Cedex, France.

In general, the above paper is directed to discrimination of an audio channel into speech/music/silence/and noise that helps improving scene segmentation. Four approaches for audio class discrimination are proposed: A "model-based approach" where models for each audio class are created, the models being based on low level features of the audio data such as cepstrum and MFCC. A "metric-based segmentation approach" uses distances between neighbouring windows for segmentation. A "rule-based approach" comprises creation of individual rules for each class wherein the rules are based on high and low level features. Finally, a "decoder-based approach" uses the hidden Makrov model of a speech recognition system wherein the hidden Makrov model is trained to give the class of an audio signal.

Furthermore, this paper describes in detail speech, music and silence properties to allow generation of rules describing each class according to the "rule based approach" as well as gender detection to detect the gender of a speech signal.

"Audio Feature Extraction and Analysis for Scene Segmentation and Classification" is disclosed by Zhu LIU and Yao WANG of the Polytechnic University Brooklyn, USA together with Tsuhan CHEN of the Carnegie Mellon University, Pittsburg, USA. This paper describes the use of associated audio information for video scene analysis of video data to discriminate five types of TV programs, namely commercials, basketball games, football games, news report and weather forecast.

According to this paper the audio data is divided into a plurality of clips, each clip comprising a plurality of frames.

A set of low level audio features comprising analysis of volume contour, pitch contour and frequency domain features as bandwidth are proposed for classification of the audio data contained in each clip.

Using a clustering analysis, the linear separability of different classes is examined to separate the video sequence into the above five types of TV programs.

Three layers of audio understanding are discriminated in this paper: In a "low-level acoustic characteristics layer" low level generic features such as loudness, pitch period and bandwidth of an audio signal are analysed. In an "intermediate-level acoustic signature layer" the object that produces a particular sound is determined by comparing the respective acoustic signal with signatures stored in a database. In a "high level semantic-model" some a priori known semantic rules about the structure of audio in different scene types (e.g. only speech in news reports and weather forecasts; speech together with noisy background in commercials) are used.

To segment the audio data, sequences of audio classes of consecutive audio clips are used. Thus, depending on the sequence of audio classes of consecutive audio clips (e.g. speech-silence-cheering/clapping-music) a suitable number of consecutive audio clips (e.g. 4) is allocated to a segment comprising one important event (e.g. "goal").

To further enhance accuracy of the above-described method, it is proposed to combine the analysis of the audio data of video data with an analysis of the visual information comprised in the video data (e.g. the respective colour patterns and shape of imaged objects).

The U.S. Pat. No. 6,185,527 discloses a system and method for indexing an audio stream for subsequent information retrieval and for skimming, gisting and summarising the audio stream. The system and method includes use of special audio prefiltering such that only relevant speech segments that are generated by a speech recognition engine are indexed.

Specific indexing features are disclosed that improve the precision and recall of an information retrieval system used after indexing for word spotting. The described method includes rendering the audio stream into intervals, with each interval including one or more segments. For each segment of an interval it is determined whether the segment exhibits one or more predetermined audio features such as a particular range of zero crossing rates, a particular range of energy, and a particular range of spectral energy concentration. The audio features are heuristically determined to represent respective audio events, including silence, music, speech, and speech on music. Also, it is determined whether a group of intervals matches a heuristically predefined meta pattern such as continuous uninterrupted speech, concluding ideas, hesitations and emphasis in speech, and so on, and the audio stream is then indexed based on the interval classification and meta pattern matching, with only relevant features being indexed to improve subsequent precision of information retrieval. Also, alternatives for longer terms generated by the speech recognition engine are indexed along with respective weights, to improve subsequent recall.

Thus, it is inter alia proposed to automatically provide a summary of an audio stream or to gain an understanding of the gist of an audio stream.

Algorithms, which generate indices from automatic acoustic segmentation are described in the essay "Acoustic Segmentation for Audio Browsers" by Don KIMBER and Lynn WILCOX. These algorithms use hidden Markov models to segment audio into segments corresponding to different speakers or acoustic classes.

Types of proposed acoustic classes include speech, silence, laughter, non-speech sounds and garbage, wherein garbage is defined as non-speech sound not explicitly modelled by the other class models.

An implementation of the known methods is proposed by George TZANETAKIS and Perry COOK in the essay "MARSYAS: A framework for audio analysis" wherein a client-server architecture is used.

When segmenting audio signals into segments it is a crucial problem that a certain sequence of audio classes of consecutive segments of audio signals usually can be allocated to a variety of possible contents/important events.

For example, the consecutive sequence of audio classes of consecutive segments of audio signals for a goal during a football match might be "speech"-"silence"-"noise"-"speech" and the consecutive sequence of audio classes of consecutive segments of audio signals for a presentation of a video clip during a news magazine might be "speech"-"silence"-"noise"-"speech", too. Thus, in the present example no unequivocal allocation of a corresponding content/important event can be performed.

To solve the above problem, known audio signal segmentation algorithms usually employ a rule based approach for the allocation of important events/contents to a certain sequence of audio classes.

Therefore, various rules are required for the allocation of the important events/contents to address the problem that a certain sequence of audio classes of consecutive segments of audio signals can be allocated to a variety of important events/contents. The determination process to find an acceptable rule for each important event/content usually is very difficult, time consuming and subjective since it is dependent on both the used raw audio signals and the personal experience of the person conducting the determination process.

In consequence it is difficult to achieve good results with known methods for segmentation of audio signals into contents since the rules for the allocation of the important events/contents are dissatisfying.

Furthermore, with respect to human-machine interfaces and call centres classification of human speech with respect to emotions is known:

Methods for automatic classification of spoken utterances based on an emotional state of a speaker are disclosed by the paper "Recognition of Negative Emotions from the Speech Signal" by C. M. LEE and S. NARAYANAN of the Department of Electrical Engineering and IMSC, University of Southern California, Los Angeles, USA, and by R. PIERACCINI, Speech Works International, New York, USA.

According to the aforesaid publication the motivation for the recognition of negative emotions in speech comes from the increased role spoken dialogue systems are playing in human-machine interaction, especially for deployment of services associated with call centres such as customer care, and for a variety of automatic training and educational applications.

Thus, the goal of an automatic emotion recognizer is defined as assignment of category labels that identify emotional states.

While semantic and discourse information also contribute in emotion recognition, the focus of this paper is on classification based on acoustic information, only.

Linear discriminate classification with Gaussian class-conditional probability distribution and k-nearest neighbourhood methods are used to classify utterances into two basic emotion states, negative and non-negative.

Another paper dealing with emotion recognizers has been published by Valery A. PETRUSHIN during the 1999 Conference on Artificial Neural Networks in Engineering (ANNIE '99). Said publication bears the title "Emotion in Speech: Recognition and Application to Call Centres" and deals with two experimental studies on vocal emotion expression and recognition.

The paper describes two experimental studies on vocal emotion expression and recognition. The first study deals with a corpus of 700 short utterances expressing five emotions: happiness, anger, sadness, fear, and normal (unemotional) state, which were portrayed by 30 non-professional actors. After evaluation a part of this corpus was used for extracting features and training backpropagation neural network models. Some statistics of the pitch, the first and second formants, energy and the speaking rate were selected as relevant features using feature selection techniques. Several neural network recognizers and ensembles of recognizers were created. The recognizers have demonstrated the following accuracy: normal state—60-75%, happiness—60-70%, anger—70-80%, sadness—70-85%, and fear—35-55%. The total average accuracy is about 70%. The second study uses a corpus of 56 telephone messages of varying length (from 15 to 90 seconds) expressing mostly normal and angry emotions that were recorded by eighteen non-professional actors. These utterances were used for creating recognizers using the methodology developed in the first study. The recognizers are able to distinguish between two states: "agitation" which includes anger, happiness and fear, and "calm" which includes normal state and sadness with the average accuracy 77%. An ensemble of such recognizers was used as a part of a decision support system for prioritising voice messages and assigning a proper agent to response the message. The architecture of the system is presented and discussed.

A useful parameter for speech recognition, which is widely used in many speech recognition systems is the mel-Cepstrum.

Calculation of the mel-cepstral coefficients from the linear prediction coefficients using recursion formulas without truncation error is disclosed by the paper "Recursive Calculation of Mel-Cepstrum from LP Coefficients". Said paper was published on Apr. 1, 1994 by Keiichi TOKUDA, Department of Computer Science, Nagoya Institute of Technology together with Takao KOBAYASHI and Satoshi IMAI, Precision and Intelligence Laboratory, Tokyo Institute of Technology, Yokohama.

It has to be emphasised that neither the paper "Recognition of Negative Emotions from the Speech Signal" nor the publication "Emotion in Speech: Recognition and Application to Call Centres" nor the paper "Recursive Calculation of Mel-Cepstrum from LP Coefficients" is linked in any manner with improving segmentation of audio signals.

Summarising, the known video signal segmentation apparatus and methods employ a three-stage approach.

At a first stage, the video signals are partitioned into video clips of a predetermined length. Said length usually is chosen so that the temporal length of the video signals comprised in each clip is constant.

Secondly, audio signals comprised in the video clips are classified with respect to their kind (e.g. music, speech, silence) into audio classes by analysing acoustic characteristics of said audio signals.

Said classification is performed based on audio class classifiers. An audio class classifier is an allocation rule for deciding which audio class the audio signal comprised in a certain audio clip belongs to.

At a third stage rule based approaches are used to identify contents/important events comprised in the video signal based on a sequence of audio classes. A sequence of audio classes belonging to one common content/important event is labelled by a code identifying said content/important event. The rules used in the third step are called content classifiers.

It is a disadvantage with said known video signal segmentation apparatus and methods that the determination process to find audio class classifiers and content classifiers tends to be time consuming, heuristic and subjective since it is depending on both the used raw audio signals and the personal experience of the person conducting the determination process.

Furthermore, it is very hard to define audio class classifiers and content classifiers that work sufficiently with all kinds of video signals.

Moreover, the accuracy of known audio segmentation apparatus tends to be insufficient.

It is the object of the present invention to overcome the above-cited disadvantages and to provide an apparatus and a method for automatic extraction of important events in audio signals that uses an easy and reliable way for the extraction of important events in audio signals and provides an enhanced accuracy.

It is a further object of the present invention to facilitate the determination process to find accurate important event classifiers for automatic extraction of important events in audio signals.

The above object is solved by an apparatus for automatic extraction of important events in audio signals comprising the combination of features of independent claim 1.

Furthermore, the above object is solved by a method for automatic extraction of important events in audio signals comprising the combination of features of independent claim 13.

In addition, the above object is solved with a method for automatic generation of important event classifying rules for extraction of important events in audio signals comprising the combination of features of independent claim 21.

Further developments are set forth in the respective dependent claims.

According to a first preferred embodiment of the present invention an apparatus for automatic extraction of important events in audio signals comprises signal input means for supplying audio signals, audio signal fragmenting means for partitioning audio signals supplied by the signal input means into audio fragments of a predetermined length and for allocating a sequence of one or more audio fragments to a respective audio window, feature extracting means for analysing acoustic characteristics of the audio signals comprised in the audio fragments and for analysing acoustic characteristics of the audio signals comprised in the audio windows and important event extraction means for extracting important events in audio signals supplied by the audio signal fragmenting means based on predetermined important event classifying rules depending on acoustic characteristics of the audio signals comprised in the audio fragments and on acoustic characteristics of the audio signals comprised in the audio windows, wherein each important event extracted by the important event extraction means comprises a discrete sequence of cohesive audio fragments corresponding to an important event included in the audio signals.

Since extraction of important events in the audio signals automatically is performed in dependency on acoustic characteristics of the audio signals comprised in the audio fragments and on acoustic characteristics of the audio signals comprised in the audio windows, only, no prior classification of the audio signals into audio classes is necessary. Thus, extraction of important events is performed in only two steps. In consequence, complexity of the extraction of important events in audio signals is significantly reduced by the inventive apparatus for automatic extraction of important events in audio signals.

Furthermore, by avoiding the step of classifying the audio signals into audio classes, it is not necessary to provide audio class classifying rules any more. Thus, the time consuming, heuristic and subjective generation of audio class classifying rules is avoided.

By avoiding audio class classifying rules the accuracy of important event extraction of audio signals is enhanced since the number of sources of error is reduced.

It is obvious that the sequence of one or more audio fragments that is allocated to a respective audio window might be a fixed temporal sequence. The length of said sequence might be depending on the respective important event classifying rules.

Advantageously, the acoustic characteristics analysed in the audio signals comprised in the audio fragments include at least zero crossing rate and/or energy/loudness and/or subband energy rate and/or mel-cepstral frequency components and/or frequency centroid and/or bandwidth.

Favourably, the acoustic characteristics analysed in the audio signals comprised in the audio windows include at least volume standard deviation and/or volume dynamic range and/or high zero crossing rate ratio and/or low short-term energy ratio and/or spectral flux.

Furthermore, it is profitable that the apparatus for automatic extraction of important events in audio signals further comprises a classifier database comprising important event classifying rules, wherein an important event classifying rule is provided for each kind of programme included in the audio signal, and classifier selection means for detecting the kind of programme the audio signals actually belong to and for choosing a suitable important event classifying rule from the important event classifying rules stored in the classifier database, wherein the important event extraction means extracts important events in audio signals based on the respective important event classifying rule chosen by the classifier selection means.

By the provision of a classifier database comprising important event classifying rules, the important event classifying rules used by the important event extraction means easily can by adapted to the observed audio signals.

Accordingly, the length of the sequence of one or more audio fragments that is allocated to a respective audio window might be adapted to the important event classifying rule chosen by the classifier selection means.

Thus, important event classifying rules that are specialised (trained) for a certain kind of audio signals might be used. The usage of specialised important event classifying rules significantly enhances accuracy of the extraction of important events in audio signals.

Detection of the kind of programme the audio fragments actually belong to automatically can be performed by the classifier selection means e.g. by detecting distinguishing acoustic characteristics in the audio signals. Said distinguishing acoustic characteristics might be provided by the feature extracting means.

It is preferred that the kind of programme the respective audio signals actually belong to is identified by the classifier selection means by using an information signal comprised in the raw signals.

By usage of an information signal (e.g. an EPG signal) comprised in the raw signals the kind of programme the audio signals actually belong to automatically can be detected with ease.

Preferably, the important event classifying rules are provided as hidden Markov models and/or Neuronal Networks and/or Gaussian Mixture Models and/or decision trees.

Advantageously, the feature extraction means detects a speech signal comprised in the audio signals of each audio window, recognises emotion in said speech signal based on acoustic characteristics of an audio signal comprised in said speech signal and outputs a corresponding emotion signal to the important event extraction means, wherein the important event extraction means uses the emotion signal provided by the feature extraction means for extracting important events in audio signals.

By using said emotion signal for extracting important events in audio signals and thus to determine individual sequences of cohesive audio fragments belonging to a common important event, the accuracy of the important event extraction means is enhanced since an additional source of information is used.

Preferably, the emotion signal output by the feature extraction means is normalised according to predetermined emotion classes.

Such a normalisation of the emotion signal significantly reduces the complexity of a processing of said emotion signal by the important event extraction means.

Moreover, it is profitable that the emotion classes comprise at least a class for each excited, disappointed, angry, happy and bored.

Thus, the most general emotions that can be recognised in human speech might be used.

It is beneficial if the acoustic characteristics used for emotion recognition comprise prosodic features including at least pitch and/or pitch range and/or intonation attitude and/or loudness and/or speaking rate and/or phone duration.

Furthermore, it is preferred that the acoustic characteristics used for emotion recognition comprise quality features including at least phonation type and/or articulatory manner and/or voice timbre and/or spectral tilt and/or difference of amplitude between harmonics and formants and/or formants bandwidth and/or jitter and/or harmonic-to-noise ratio.

Usage of at least prosodic features and/or quality features of the audio signal allows an easy and reliable recognition of an emotion in a speech signal.

Preferably, the apparatus for automatic extraction of important events in audio signals further comprises signal output means to generate an output file, wherein the output file contains at least the raw signals supplied to the signal input means and an information signal comprising information regarding to the important events included in the raw signals.

Provision of such an information signal allows a distinct identification of the important events extracted from the raw audio signals. Search engines and signal playback means can handle such an output file with ease. Therefore, a research for the important events comprised in the output file can be performed with ease.

Furthermore, the above object is solved by a method for automatic extraction of important events in audio signals comprising the following steps:
  partitioning audio signals into audio fragments of a predetermined length;
  allocating a sequence of one or more audio fragments to a respective audio window of a plurality of audio windows;
  analysing acoustic characteristics of the audio signals comprised in the audio fragments;
  analysing acoustic characteristics of the audio signals comprised in the audio windows; and
  extracting important events in audio signals based on predetermined important event classifying rules by using acoustic characteristics of the audio signals comprised in the audio fragments and acoustic characteristics of the audio signals comprised in the audio windows, wherein each important event comprises a discrete sequence of cohesive audio fragments corresponding to an important event included in the audio signals.

Preferably, the step of analysing acoustic characteristics in the audio signals comprised in the audio fragments includes analysis of zero crossing rate and/or energy/loudness and/or sub-band energy rate and/or mel-cepstral frequency components and/or frequency centroid and/or bandwidth.

Favourably, the step of analysing acoustic characteristics in the audio signals comprised in the audio windows includes analysis of volume standard deviation and/or volume dynamic range and/or high zero crossing rate ratio and/or low short-term energy ratio and/or spectral flux.

It is beneficial if the method for automatic extraction of important events in audio signals further comprises the steps of:
  providing a classifier database comprising important event classifying rules, wherein an important event classifying rule is provided for each kind of programme included in the audio signal;
  detecting the kind of programme the audio signals actually belong to; and
  choosing a suitable important event classifying rule from the important event classifying rules stored in the classifier database;
wherein the step of extracting important events in audio signals is performed based on said suitable important event classifying rule.

Moreover, it is preferred that the method for automatic extraction of important events in audio signals further comprises the steps of
  detecting a speech signal comprised in the audio signal of each audio window,
  recognising an emotion in said speech signal based on acoustic characteristics of an audio signal comprised in said speech signal; and
  outputting a corresponding emotion signal;
wherein the step of extracting important events in audio signals is performed by using said emotion signal.

According to a preferred embodiment of the present invention the method further comprises the step of normalising the emotion signal according to predetermined emotion classes.

Favourably, the acoustic characteristics used in the step of recognising an emotion in a speech signal comprise prosodic features including pitch and/or pitch range and/or intonation attitude and/or loudness and/or speaking rate and/or phone duration.

Moreover, it is beneficial if the acoustic characteristics used in the step of recognising an emotion in a speech signal comprise quality features including phonation type and/or articulatory manner and/or voice timbre and/or spectral tilt and/or difference of amplitude between harmonics and formants and/or formants bandwidth and/or jitter and/or harmonic-to-noise ratio.

Furthermore, the above object is solved by a method for automatic generation of important event classifying rules for extraction of important events in audio signals comprising the following steps:
  partitioning audio signals into audio fragments of a predetermined length;
  allocating a sequence of one or more audio fragments to a respective audio window of a plurality of audio windows;
  tagging each audio window with a predefined important event label;
  extracting fragment characteristics for the audio fragments of a given window by analysing acoustic characteristics of the audio signals comprised in the audio fragments of a given window;
  extracting window characteristics for the respective audio window by analysing acoustic characteristics of the audio signals comprised in the respective audio window; and
  generating an important event classifying rule for the respective important event label by using the fragment characteristics and the window characteristics.

Thus, according to the present invention, the important event classifying rules are generated automatically based on acoustic characteristics of the audio signals comprised in the audio fragments and acoustic characteristics of the audio signal comprised in the respective audio windows. Said important event classifying rules are adapted to immediately extract important events in audio signals based on acoustic characteristics of said audio signals without prior classification of fragments of audio signals or analysis of a sequence of coherent audio classes.

Therefore, no classification of the audio signals is necessary.

It is obvious that the (temporal) length of the sequence of one or more audio fragments that is allocated to a respective audio window might be variable or fixed/constant. The length of said sequence either might be determined automatically or chosen manually by a user in dependency on the important event comprised in the audio signals of the respective sequence.

It is preferred that the step of extracting fragment characteristics comprises calculation of at least a zero cross rate and/or volume and/or sub-band energy rate and/or mel-cepstral frequency components and/or frequency centroid and/or bandwidth of the audio signal comprised in the respective video fragment.

Therefore, common features of the audio signals can be used as acoustic characteristics.

Favourably, the step of extracting window characteristics comprises calculation of at least a volume standard deviation and/or a volume dynamic range and/or a high zero crossing rate ratio and/or a low short-term energy ratio and/or spectral flux of the audio signal comprised in the respective video window.

In the present embodiment it is further preferred that the method further comprises the steps of:
  detecting a speech signal in the audio signal comprised in the respective audio window; and
  recognising emotion in the speech signal based on prosodic features and/or quality features of said speech signal;
wherein the step of generating an important event classifying rule for the respective important event label is performed by using said recognised emotion.

By recognising emotion in a speech signal and by using said emotion for generating an important event classifying rule for the respective important event label the accuracy of the respective important event classifying rule is significantly enhanced.

Advantageously, the prosodic features include at least pitch and/or pitch range and/or intonation attitude and/or loudness and/or speaking rate and/or phone duration, and the quality features include at least phonation type and/or articulatory manner and/or voice timbre and/or spectral tilt and/or difference of amplitude between harmonics and formants and/or formants bandwidth and/or jitter and/or harmonic-to-noise ratio.

Furthermore, the above object is solved by a software product comprising a series of state elements that are adapted to be processed by a data processing means of a terminal such, that a method according to one of the claims 13 to 25 may be executed thereon.

Figure 1:
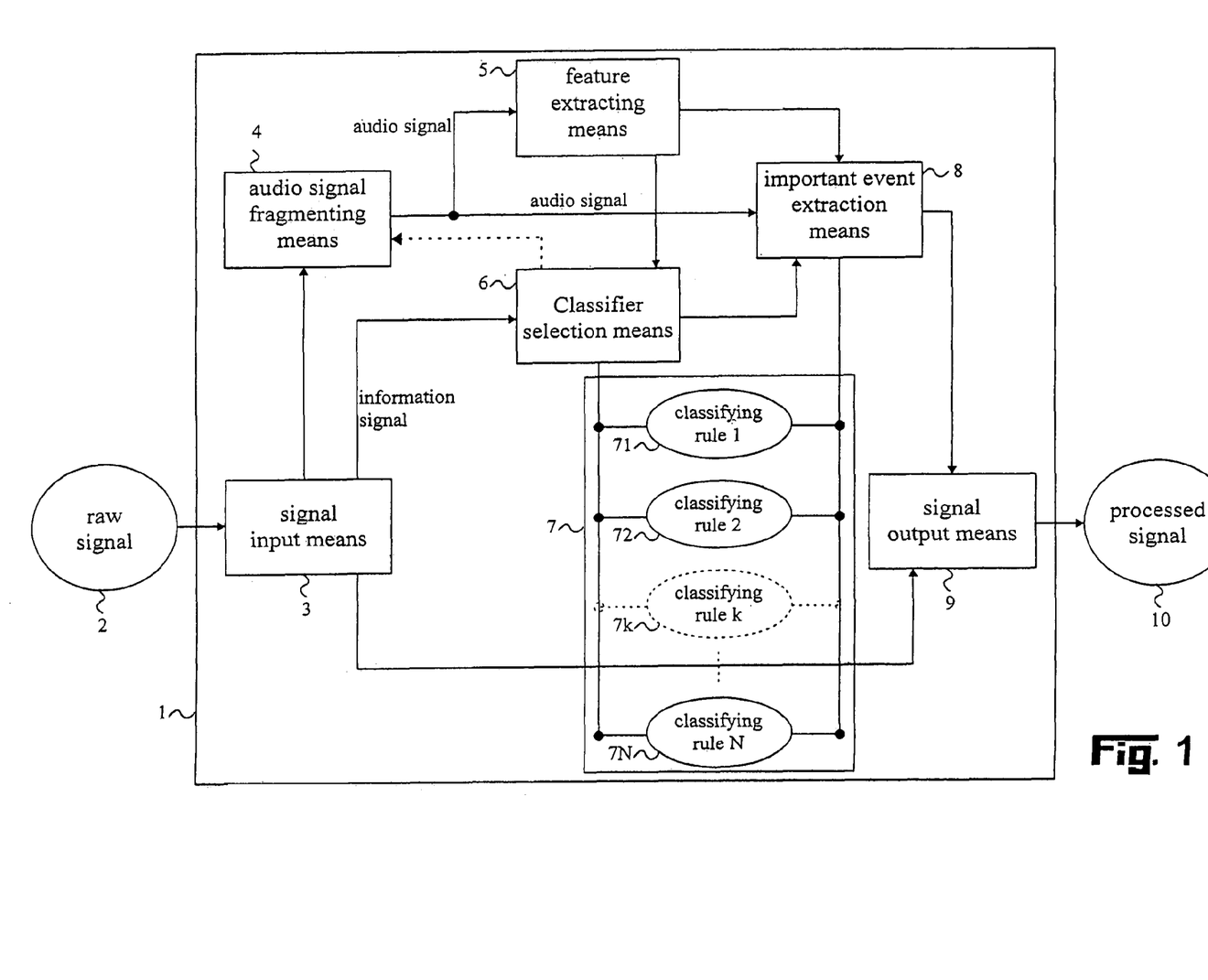
FIG. 1 shows a block diagram of an apparatus for automatic extraction of important events in audio signals according to a preferred embodiment of the present invention.

In the following detailed description, the present invention is explained by reference to the accompanying drawings, in which like reference characters refer to like parts throughout the views, wherein:

FIG. 1 shows a block diagram of an apparatus for automatic extraction of important events in audio signals according to the one preferred embodiment of the present invention.

In the present embodiment, a raw audio signal 2 is supplied to signal input means 3 of the inventive apparatus for automatic extraction of important events in audio signals 1.

In the present example, the raw audio signal 2 provided to the signal input means 3 is a digital video data file which is stored on a suitable recording medium (e.g. a hard disc or a digital video disc).

The digital video data file is composed of at least an audio signal, a picture signal and an information signal. In the present example, said information signal is a typical EPG (Electronic Program Guide) signal.

Therefore, the information signal allows identification of both a programme and a category the signals comprised in the digital video data file belong to.

It is obvious for a skilled person that alternatively an information signal allowing identification of a category the signals comprised in the digital video data file belong to other than an EPG signal might be used.

Further alternatively, the raw signals provided to the signal input means 3 might be real time video signals of a conventional television channel or an audio signal of a radio broadcasting station.

According to this embodiment, the apparatus for automatic extraction of important events in audio signals 1 is included into a digital video recorder, which is not shown in the figures.

Alternatively, the apparatus for automatic extraction of important events in audio signals might be included in a different digital audio/video apparatus, such as a personal computer or workstation or might even be provided as a separate equipment (e.g. a top set box).

The signal input means 3 converts the raw signals 2 into a suitable format.

Audio signals comprised in the raw signal 2 provided to signal input means 3 are read out by the signal input means 3 and transmitted to audio signal fragmenting means 4.

The information signal comprised in the raw signals 2 is transmitted to classifier selection means 6 by the signal input means 3.

The audio signal fragmenting means 4 partitions said audio signals into audio fragments of a predetermined length.

Said audio fragments preferably are the smallest unit of audio signal analysis, respectively.

In the present embodiment, one audio fragment comprises one frame of audio (video) signals and is about 10 milliseconds in length.

It is obvious for a skilled person that the audio fragments alternatively might comprise more than one frame of audio (video) signals.

Furthermore, one frame might comprise more or less than 10 milliseconds of audio signals (preferably between 4 and 20 milliseconds of audio signals, e.g. 6, 8, 12 or 14 milliseconds of audio signals).

According to an alternative embodiment more than one frame is comprised in an audio fragment. In this case it is evident for a man skilled in the art that the audio signals comprised in each audio fragment might be further divided into a plurality of frames of e.g. 512 samples. In this case it is profitable if consecutive frames are shifted by 180 samples with respect to the respective antecedent frame. This subdivision allows a precise and easy processing of the audio signals comprised in each audio fragment.

Furthermore, the audio signal fragmenting means 4 allocates a sequence of one or more audio fragments and thus of one or more frames to a respective audio window.

In the present embodiment, the (temporal) length of said sequence and thus the number of fragments comprised in each audio window is depending on the respective important event classifying rule applied to the respective audio signal.

According to an alternative embodiment, the (temporal) length of the sequence of one or more audio fragments that is allocated to a respective audio window might be a fixed temporal sequence. Thus, each audio window might comprise the same number of audio fragments.

It is important to emphasise that the audio signal fragmenting means 4 do not necessarily subdivide the audio signals into audio fragments in a literal sense. In the present embodiment, the audio signal fragmenting means 4 define segments of audio signals comprising a suitable amount of audio signals within the audio signals, only.

Correspondingly, even allocation of a fixed temporal sequence of one or more audio fragments/frames to a respective audio window is not necessarily performed in a literal sense.

In the present example, the audio signal fragmenting means 4 generates a meta data file defining audio fragments and audio windows in the audio signal while the audio signal itself remains unamended.

The audio fragments and audio windows defined by the audio signal fragmenting means 4 are further transmitted to feature extracting means 5 and important event extraction means 8.

The feature extracting means 5 analyses acoustic characteristics of audio signals comprised in the audio fragments.

In the present embodiment, zero crossing rate and energy/loudness and sub-band energy rate and mel-cepstral frequency components and frequency centroid and bandwidth of the signals comprised in the audio fragments are analysed by the feature extracting means 5.

Moreover, the feature extracting means 5 analyses acoustic characteristics of the audio signals comprised in the audio windows.

In the present embodiment, volume standard deviation and volume dynamic range and high zero crossing rate ratio and low short-term energy ratio and spectral flux of the audio signals comprised in the audio windows are analysed.

According to an alternative embodiment only some of the above cited acoustic characteristics of audio signals comprised in the audio fragments and audio windows are analysed.

Both the acoustic characteristics of audio signals comprised in the audio fragments and the acoustic characteristics of the audio signals comprised in the audio windows are output to the important event extraction means 8 by the feature extracting means 5. Additionally, said acoustic characteristics are output to classifier selection means 6.

Furthermore, prosodic features (pitch, pitch range, intonation attitude, loudness, speaking rate and phone duration) and quality features (phonation type, articulatory manner, voice timbre, spectral tilt, difference of amplitude between harmonics and formants, formants bandwidth, jitter and harmonic-to-noise ratio) of the audio signals comprised in the audio windows are analysed by the feature extracting means 5.

By analysing the above prosodic features and quality features in the audio signals comprised in each audio window, the feature extraction means 5 reliably detects a speech signal comprised in the audio signals of each audio window.

According to an alternative embodiment only some of the above cited prosodic features and quality features of the audio signals comprised in the audio windows are analysed to detect a speech signal comprised in the audio signals of each audio window.

Based on an emotion recognised in the speech signal an emotion signal is generated by the feature extracting means 5. Recognition of said emotion is performed by well known techniques.

Said emotion signal is normalised by the feature extracting means 5 according to predetermined emotion classes. In the present example, said emotion classes comprise a class for each excited, disappointed, angry, happy and bored.

Thus, the most general emotions that can be recognised in human speech are used.

Furthermore, normalisation of the emotion signal significantly reduces the complexity of a further processing of said emotion signal.

The emotion signal generated by the feature extracting means 5 is output to the important event extraction means 8, too.

The important event extraction means 8 automatically extracts important events/contents in the audio signals supplied by the audio signal fragmenting means 4, wherein each important event extracted by the important event extraction means 8 comprises a discrete sequence of cohesive audio fragments corresponding to an important event (content) included in the audio signals.

Said important event is a self-contained activity having a certain minimum importance which is comprised in the audio signals contained in the sequence of cohesive audio fragments.

If the category of the audio signals is news and the programme is a certain newsmagazine, for example, the important events (contents) might be the different notices mentioned in said newsmagazine.

Said extraction of important events is performed by the important event extraction means 8 by using predetermined important event classifying rules 71, 72, 7k, 7N based on acoustic characteristics of the audio signals comprised in the audio fragments and on acoustic characteristics of the audio signals comprised in the audio windows, respectively.

As mentioned before, said acoustic characteristics are provided by the feature extracting means 5.

Furthermore, the emotion signal provided by the feature extraction means 5 is used by the important event extraction means 8 for extracting important events in audio signals and thus for identifying important events in the audio signal.

It is obvious for a skilled person that the extraction of important events in the audio signals is not necessarily performed in a literal sense, but might be performed e.g. by automatically generating a meta file (information signal) dedicated to the (raw) audio signal, the meta file comprising e.g. pointers to identify the important events in the audio signal.

In the present embodiment, said pointers contained in the meta file identify both the location and the contents of the important events in the audio signals.

According to an alternative embodiment, the audio signals supplied by the audio signal fragmenting means automatically might be segmented by the important event extraction means into discrete sequences of cohesive audio clips, wherein each sequence of cohesive audio clips corresponds to an important event comprised in the audio signals.

It is obvious that said segmentation does not necessarily has to be performed continuously. Gaps of unsegmented audio signals might be provided between consecutive sequences of cohesive audio clips that have been allocated to important events by the important event extraction means.

A plurality of important event classifying rules 71, 72, 7k, 7N are stored in a classifier database 7, wherein an important event classifying rule is provided for each kind of programme included in the audio signal.

In this respect it is obvious for a skilled person that each important event classifying rule itself might contain a plurality of secondary rules.

In the present example, the predetermined important event classifying rules 71, 72, 7k, 7N are stored in the classifier database 7 as hidden Markov models.

Alternatively, the important event classifying rules might even be provided e.g. as Neuronal Networks and/or Gaussian Mixture Models and/or decision trees.

In the present embodiment, said classifier database 7 is a convention hard disc. Alternatively, e.g. an EEPROM or a FLASH-memory might be used.

The classifier selection means 6 identifies the kind of programme the respective audio signals actually belong to by using the information signal provided by the signal input means 3.

By usage of the information signal (EPG signal) comprised in the raw signals 2 the kind of program the audio signals actually belongs to automatically is detected with ease by the classifier selection means 6.

Alternatively, the kind of programme the audio signals actually belong to automatically might be detected by the classifier selection means 6 by detecting distinguishing acoustic characteristics in the audio signals which are provided by the feature extracting means 5.

Further alternatively, the kind of programme the audio signals actually belong to might be input manually by a user by using a user interface (not shown in the Figures).

Based on the kind of programme the audio signals actually belong to, the classifier selection means 6 chooses a suitable important event classifying rule 71 from the important event classifying rules 71, 72, 7k, 7N stored in the classifier database 7.

In the present embodiment the audio signal fragmenting means 4 automatically chooses the number of fragments comprised in each audio window in dependency on the respective important event classifying rule 71 chosen by the classifier selection means 6.

Furthermore, the important event extraction means 8 extracts important events in the audio signals based on the respective important event classifying rule 71 chosen by the classifier selection means 6.

Since extraction of important events in the audio signals is performed in dependency on acoustic characteristics of the audio signals comprised in the audio fragments and on acoustic characteristics of the audio signals comprised in the audio windows by using the respective important event classifying rule 71, only, no prior classification of the audio signals into audio classes is necessary.

Thus, extraction of important events is performed in only two steps. In consequence, complexity of the extraction of important events in audio signals is significantly reduced by the inventive apparatus for automatic extraction of important events in audio signals 1.

Furthermore, by avoiding the step of classifying the audio signals into audio classes, it is not necessary to provide audio class classifying rules any more. Thus, the time consuming, heuristic and subjective generation of audio class classifying rules is avoided.

Moreover, by avoiding audio class classifying rules the accuracy of important event extraction of audio signals is enhanced since the number of sources of error is reduced.

By the provision of a classifier database comprising important event classifying rules the important event classifying rules used by the important event extraction means easily and individually can by adapted to the observed audio signals.

Thus, important event classifying rules that are specialised (trained) for a certain kind of audio signals might be used. The usage of specialised important event classifying rules significantly enhances accuracy of the extraction of important events in the audio signals with respect to self-contained activities meeting a minimum importance actually comprised in the raw audio signals.

By additionally using the emotion signal provided by the feature extraction means 5 for segmenting audio signals into individual sequences of cohesive audio fragments the important event extraction means 8 allows an automatic extraction of important events in audio signals with an enhanced accuracy since an additional source of information is used for important event extraction.

Furthermore, the inventive apparatus for automatic extraction of important events in audio signals 1 comprises signal output means 9.

Said signal output means 9 automatically generates a processed signal 10 containing the raw signal 2 supplied by the signal input means 3 and an information signal (meta file) comprising information regarding to the important events included in the raw signal 2.

A correspondingly processed signal 10 can be handled by search engines and signal playback means with ease. Therefore, a research for the important events comprised in the processed signal 10 is facilitated.

In the following, preferred methods for the analysis of acoustic characteristics of the audio signals are explained in detail:

The following acoustic characteristics preferably are analysed in the audio signals comprised in the audio fragments:

RMS (Volume)

$$v_n = \sqrt{p_n(n)}$$

$$p_n = \frac{1}{N} \sum_{i=0}^{N-1} s_n^2(i)$$

n→the nth frame
$s_n(i)$→ith sample of the ADC signal
N→number of samples in a frame ($f_s$x frame length).

Zero Crossing Rate ZCR $ZCR_n$: Frame-based Zero-Crossing-Rate/sec→number of times per second that the ADC signal changes its sign Frequency Centroid and Bandwidth $$C_n = \frac{\sum_{k=1}^{Ncoef} k \times \Delta f \times |F_n(k)|^2}{\sum_{k=1}^{Ncoef} |F_n(k)|^2}$$

$$BW_n = \sqrt{\frac{\sum_{k=1}^{Ncoef} (k \times \Delta f - C_n^2|F_n(k)|^2}{\sum_{k=1}^{Ncoef} |F_n(k)|^2}}$$

N→number of samples in a frame
k→index of the Fourier coefficients (k=0 ... N/2)
$N_{coef}$→number of coefficients of the FFT (N/2)
$|F_n(k)|^2$→power spectrum of frame nth corresponding to the kth coefficient
$\Delta f$→frequency step of the FFT→$\Delta f = f_s/N$ with $f_s$→sampling rate.

| ERBS (sub-band energy rate) | | |
|---|---|---|
| | From | To |
| Band 0: 0-630 Hz | $k_0 = 0*$ | $k_1 = \left[\dfrac{630}{\Delta f}\right]$ |
| Band 1: 630-1720 Hz | $k_1 + 1$ | $k_1 = \left[\dfrac{1720}{\Delta f}\right]$ |
| Band 2: 1720-4400 Hz | $k_2 + 1$ | $k_1 = \left[\dfrac{4400}{\Delta f}\right]$ |
| Band 3: 4400-11025 Hz | $k_3 + 1$ | $k_1 = \left[\dfrac{11025}{\Delta f}\right]$ |

$$ERBS_{n,h} = \frac{\sum_{k=k_h}^{k_{h+1}} |F_n(k)|^2}{\sum_{k=0}^{N_{coef}f} |F_n(k)|^2}$$

b→each band according to the table (b=0, 1, 2, 3)
N→number of samples in a frame
n→index of the nth frame in the adc signal
k→index of the Fourier coefficients (k=0 ... N/2)
$N_{coef}$→number of coefficients of the FFT (N/2)
$|F_n(k)|^2$→power spectrum of frame nth corresponding to the kth coefficient.

The following acoustic characteristics preferably are analysed in the audio signals comprised in the audio windows:

All the calculations are carried out taking into account the labelled speech signal. "A region" is a uniformly labelled section of speech, i.e. all the region belongs to the same class. Window-based calculations do not mix two different labelled regions, instead, the computing is successively made between the beginning and the end of each region. The number of windows within a uniformly labelled region is:

$$\frac{\text{num\_frames\_region}}{\text{frames\_in\_1 sec-}window} + 1$$

where both terms of the quotient are rounded to the next lower integer. For instance, supposing the frame shift is 10 ms, a region of 12.56 s will have 1256 frames and 1-second window will contain 100 frames. Therefore, the number of windows are 13 with the last one containing just 56 frames.*

For each window, $W_1$, one feature value is estimated.

VSTD (Volume Standard Deviation)

$$VSTD_{W_i} = \frac{1/W \sum_{n=0}^{W-1} (v_n - \bar{v}_n)^2}{\max_W \{v_n\}}$$

n→index of the nth frame in the region
W→the number of frames in a window
$\bar{v}_n$→mean volume in a window
$\max_W\{v_n\}$→maximum volume within a window.

VDR (Volume Dynamic Range)

$$VDR_{W_i} = \frac{\max_{W_i} - \min_{W_i}}{\max_{W_i}}$$

$\max_{W_i}\{v_n\}$ and $\min_{W_i}\{v_n\}$ represent the maximum and minimum volume within the window HZCRR (High Zero-Crossing Rate Ratio)
First, the mean of the ZCR is computed within the window:

$$avZCR_{W_i} = \frac{\sum_{n=0}^{W-1} ZCR_n}{W}$$

W→number of frames in a window
n→frame nth in the window

Then, for each frame, the value of ZCR is compared with a threshold to see if it ZCR value is above 1.5 fold average ZCR in the window. For all the frames (n) within a window (W).

$$\text{If } ZCR_n \geq 1.5 \times avZCR_{W_i} \rightarrow contHZCRR_W\text{++}$$

And finally, the ratio of frames whose ZCR are above $avZCR_{W_i}$ is:

$$HZCRR_{W_i} = \frac{contHZCRR_W}{W}$$

LSTER (Low Short-Term Energy Ratio)
Definition of short-time energy is:

$$STE_n = 1/N \sum_{i=0}^{N-1} s_n^2(i)$$

First, the mean of STE is computed within the window:

$$avSTE_{W_i} = \frac{\sum_{n=0}^{W-1} STE_n}{W}$$

W→number of frames in a window
n→frame nth in the window.

Then, for each frame, if the value of STE is lower than half the average over the window, it is considered as low-short energy, otherwise not. For all the frames (n) within a window (W):

$$\text{If } STE_n \leq 0.5 \times avSTE_{W_i} \rightarrow contSTE_W\text{++}$$

And finally, the ratio of frames whose STE are "low energy":

$$LSTER_{W_i} = \frac{contSTE_W}{W}$$

SF (Spectral Flux)
Average variation value of spectrum between the adjacent two frames in one window:

$$SF_{W_i} = \frac{1}{N_{coef} \times (W-1)} \sum_{n=1}^{W-1} \sum_{k=1}^{Ncoef} [\log(|F_n(k)| + 1) - \log(|F_{n-1}(k)| + 1)]^2$$

n→index of the nth frame within the window (n=0 ... W−1).
N→number of samples in a frame.
k→index of the Fourier coefficients (k=0 ... N/2).
$N_{coef}$→number of coefficients of the FFT (N/2).
$|F_n(k)|$ is the amplitude spectrum of frame nth corresponding to the kth coefficient.

Figure 2:
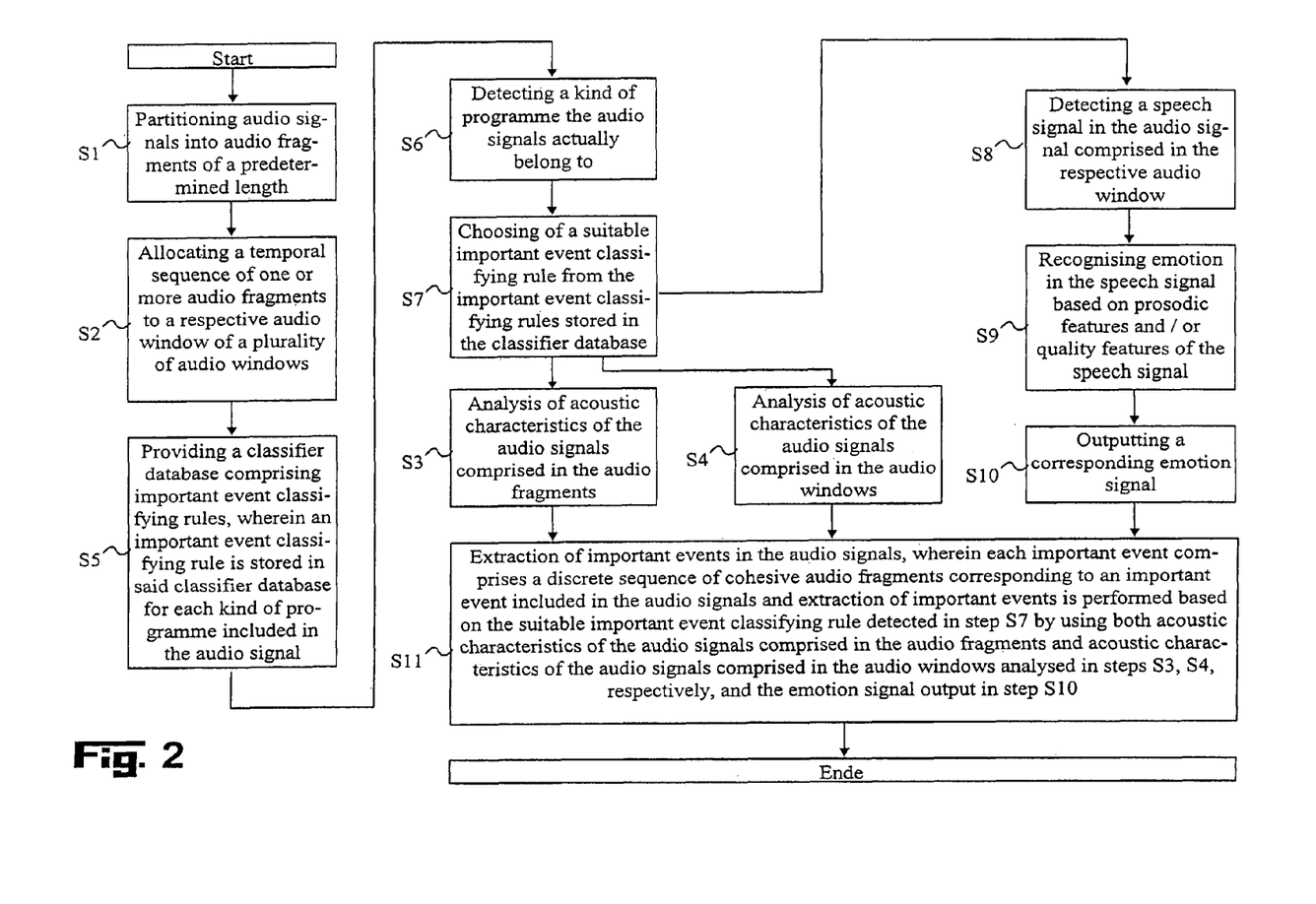
FIG. 2 shows a flow diagram of a preferred embodiment of the inventive method for automatic extraction of important events in audio signals.

FIG. 2 shows a flow diagram of the inventive method for automatic extraction of important events in audio signals according to the one preferred embodiment of the present invention.

In step S1 audio signals automatically are partitioned into audio fragments of a predetermined length. In the present preferred embodiment, the length of the fragments is one frame, each.

In the following step S2 a temporal sequence of one or more cohesive audio fragments automatically is allocated to a respective audio window of a plurality of audio windows.

In the present embodiment, the (temporal) length of the sequence of one or more audio fragments that is allocated to a respective audio window is a fixed temporal length and thus constant. Therefore, each audio window comprises the same number of audio fragments.

According to an alternative embodiment, the (temporal) length of said sequence and thus the number of fragments comprised in each audio window might be depending on the respective important event classifying rule chosen in the step S7 of choosing a suitable important event classifying rule. It is obvious for a skilled person that the order/succession of steps S2 and S5-S7 would have to be permuted in this case.

A classifier database 7 comprising important event classifying rules 71, 72, 7k, 7N is provided in method step S5. An important event classifying rule is stored in said classifier database for each kind of programme included in the audio signal.

A kind of programme the audio signal actually belongs to automatically is detected in the following step S6 while a suitable important event classifying rule 71 from the important event classifying rules 71, 72, 7k, 7N stored in the classifier database 7 automatically is chosen in step S7.

The acoustic characteristics of the audio signals comprised in the audio fragments and the acoustic characteristics of the audio signals comprised in the audio windows automatically are analysed in the parallel steps S3 and S4, respectively.

Parallel to method step S4 a speech signal comprised in the audio signal of each audio window automatically is detected in step S8.

In step S9, an emotion in said speech signal automatically is recognised based on acoustic characteristics of an audio signal comprised in said speech signal.

Afterwards, a corresponding emotion signal automatically is output in step S10.

In the method step S11, important events automatically are extracted in the audio signal, each important event comprising a discrete sequence of cohesive audio fragments corresponding to an important event included in the audio signals.

Said extraction of important events is performed in step S11 based on the important event classifying rule 71 detected in step S7 by using both acoustic characteristics of the audio signals comprised in the audio fragments and acoustic characteristics of the audio signals comprised in the audio windows. Furthermore, the emotion signal output in step S10 is used in step S11 for extracting important events in the audio signals.

As said before, extraction of said important events has not necessarily to be performed in a literal way, but might be performed by automatically generating a meta file/information signal which allows identification of said important events in the audio signals.

Alternatively, a segmentation of the audio signals into individual sequences of cohesive audio clips might be performed, wherein each sequence of cohesive audio clips corresponds to an important event/content (self-contained activity meeting minimum importance) included in the audio signals.

Figure 3:
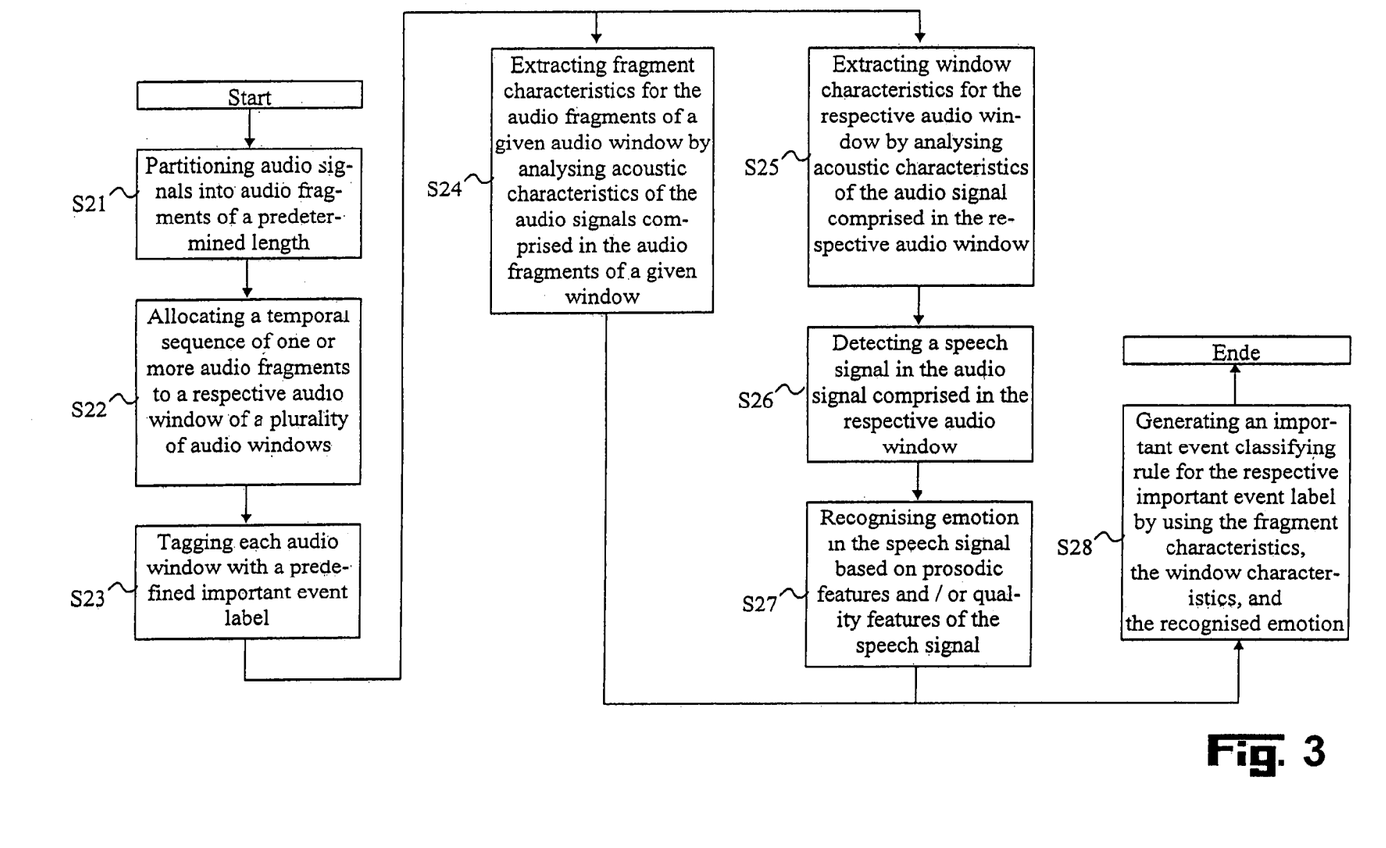
FIG. 3 shows a flow diagram of a preferred embodiment of the inventive method for automatic generation of important event classifying rules for automatic extraction of important events in audio signals.

In the following, the inventive method for automatic generation of important event classifying rules for automatic extraction of important events in audio signals is explained with reference to FIG. 3.

In a first step S21, the audio signals automatically are divided into audio fragments of a predetermined length. In the present embodiment, each audio fragment comprises one frame (about 10 milliseconds) of audio signals.

According to an alternative embodiment, each audio fragment might comprise plural frames or an arbitrary amount of audio signals.

A temporal sequence of one or more audio fragments is allocated to a respective audio window in a second step S22.

It is obvious that the (temporal) length of the sequence of one or more audio fragments that is allocated to a respective audio window might be variable or fixed (constant). Therefore, the number of audio fragments included in each audio window might be variable or fixed (constant).

The length of said sequence either might be determined automatically or chosen manually by a user in dependency on the length of a respective important event comprised in the audio signals.

In the present embodiment, the allocation of a temporal sequence of one or more audio fragments to a respective audio window in step S22 is performed manually by a user.

In step S23, each audio window manually or automatically is tagged with a predefined (e.g. manually generated) important event label.

Said important event labels characterise important events/contents (self-contained activity meeting minimum importance) contained in the audio signals comprised in each audio window. If the kind of programme is e.g. football, said important events/contents might be kick-off, penalty kick, throw-in etc. Thus, in case the kind of programme is football, an important event label is provided to identify each kick-off, penalty kick, throw-in etc.

In the present embodiment, the tagging of the audio windows in step S23 is performed manually by a user in dependency on the respective important event comprised in the audio signals contained in the respective audio window.

In the following step S24, acoustic characteristics of audio signals comprised in the audio fragments of a given window automatically are analysed to extract fragment characteristics.

In the present embodiment, said analysis of acoustic characteristics of audio signals comprised in the audio fragments is performed by calculation of a zero cross rate and/or volume and/or sub-band energy rate and/or mel-cepstral frequency components and/or frequency centroid and/or bandwidth of the audio signals comprised in the respective audio fragments.

In the parallel step S25, acoustic characteristics of the audio signals comprised in the respective audio windows automatically are analysed to extract window characteristics.

In the present embodiment, said analysis of acoustic characteristics of audio signals comprised in the respective audio windows is performed by calculation of a volume standard deviation and/or a volume dynamic range and/or a high zero crossing rate ratio and/or a low short-term energy ratio and/or spectral flux of the audio signals comprised in the respective audio windows.

In the following step S26, a speech signal in the audio signal comprised in the respective audio windows automatically is detected.

Afterwards, in step S27, emotion in said speech signal automatically is recognised based on analysis of prosodic features and/or quality features of the speech signal.

In the present embodiment, said prosodic features include pitch and/or pitch range and/or intonation attitude and/or loudness and/or speaking rate and/or phone duration.

Furthermore, in the present embodiment, said quality features include phonation type and/or articulatory manner and/or voice timbre and/or spectral tilt and/or difference of amplitude between harmonics and formants and/or formants bandwidth and/or jitter and/or harmonic-to-noise ratio.

Finally, in step S28, an important event classifying rule for the respective important event label automatically is generated by using the fragment characteristics, the window characteristics and the recognised emotion.

Therefore, an important event classifying rule specialised for each predefined important event label automatically can be found by using the inventive method for automatic generation of important event classifying rules.

Since said important event classifying rules automatically can be generated by using a plurality of audio windows with the predefined important event label, said important event classifying rules reliably can be trained and therefore provide a high accuracy. Furthermore, said automatically generated important event classifying rules are not subjective since its criteria are not arbitrarily chosen by a user.

Thus, according to the present invention, the important event classifying rules are generated automatically based on both acoustic characteristics of the audio signals comprised in the audio fragments and acoustic characteristics of the audio signal comprised in the respective audio window. The correspondingly generated important event classifying rules are adapted to immediately extract important events in audio signals without prior classification of said audio signals.

By additionally recognising emotion in a speech signal of a tagged audio window and by using said emotion for automatically generating an important event classifying rule for the respective important event, the accuracy of the respective important event classifying rule is further significantly enhanced.

To enhance clarity of FIG. 1, supplementary means as power supply, buffer memories etc. are not shown.

In the one embodiment of the present invention shown in FIG. 1, separate microprocessors are used for the signal input means 3, the audio signal fragmenting means 4, the feature extracting means 5, the classifier selection means 6, the important event extraction means 8 and the signals output means 9.

Alternatively, one single microcomputer might be used to incorporate the signal input means, the audio signal fragmenting means, the feature extracting means, the classifier selection means, the important event extraction means and the signals output means.

Further alternatively, the signal input means and the signal output means might be incorporated in one common microcomputer and the audio signal fragmenting means, the feature extracting means, the classifier selection means and the important event extraction means might be incorporated in another common microcomputer.

Preferably, the inventive audio signals important event extraction apparatus might be integrated into a digital video recorder or top set box or realised by use of a conventional personal computer or workstation.

According to a further embodiment of the present invention (which is not shown in the figures), the above object is solved by a software product comprising a series of state elements which are adapted to be processed by a data processing means of a terminal such, that a method according to one of the claims 13 to 25 may be executed thereon.

Said terminal might be a personal computer or video recording/reproducing apparatus, for example.

In summary, the inventive apparatus and method for automatic extraction of important events in audio signals uses an easy and reliable way for the extraction of important event in audio signals and provides an enhanced accuracy. Furthermore, a method for automatic generation of important event classifying rules for extraction of important event in audio signals is provided.

As is evident from the foregoing description and drawings, the present invention provides substantial improvements in an apparatus and a method for the automatic extraction of important events in audio signals as well as in the determination process to find accurate important classifiers for the automatic extraction of important events in audio signals. It will also be apparent that various details of the illustrated examples of the present invention, shown in the preferred embodiments, may be modified without departing from the inventive concept and the scope of the appended claims.

The invention claimed is:

1. An apparatus for automatic extraction of important events in audio signals comprising:
   a signal input processing circuit configured to supply Electronic Program Guide signals, audio signals, and video signals that correspond to the audio signals;
   an audio signal fragmenting processing circuit configured to partition the audio signals supplied by the signal input processing circuit into audio fragments of a predetermined length and to allocate a sequence of one or more audio fragments to a respective audio window;
   a classifier database including important event classifying rules, where an important event classifying rule is provided for each different category of program, including a news category, a sports category, a movie category, and a document film category, included in the audio signals;
   a classifier selection processing circuit configured to identify the category of program, from among the news category, the sports category, the movie category, and the document film category, that the audio signals actually belong to using the Electronic Program Guide signals, and to choose a suitable important event classifying rule from the important event classifying rules stored in the classifier database based on the identified category of program, each of the news category, the sports category, the movie category, and the document film category having a different important event classifying rule;
   a feature extracting processing circuit configured to analyze acoustic characteristics of the audio signals included in the audio fragments, and to analyze acoustic characteristics of the audio signals comprised in the audio windows; and
   an important event extraction processing circuit configured to extract important events in audio signals supplied by the audio signal fragmenting processing circuit based on the identified category of program and the respective important event classifying rule chosen by the classifier selection processing circuit depending on the acoustic characteristics of the audio signals included in the audio fragments and on the acoustic characteristics of the audio signals included in the audio windows, each of the important events extracted by the important event extraction processing circuit includes a discrete sequence of cohesive audio fragments corresponding to an important event included in the audio signals.

2. The apparatus for automatic extraction of important events in audio signals according to claim 1,
   wherein
   the important event classifying rules are provided as one or more of hidden Markov models, Neuronal Networks, Gaussian Mixture Models, or decision trees.

3. The apparatus for automatic extraction of important events in audio signals according to claim 1,
   wherein
   the feature extraction processing circuit detects a speech signal included in the audio signal of each audio window, recognises emotion in said speech signal based on a third set of acoustic characteristics of an audio signal comprised in said speech signal and outputs a corresponding emotion signal to the important event extraction processing circuit, and wherein the important event extraction processing circuit uses the emotion signal provided by the feature extraction processing circuit to extract important events in audio signals.

4. The apparatus for automatic extraction of important events in audio signals according to claim 3,
wherein
the emotion signal output by the feature extraction processing circuit is normalised according to predetermined emotion classes.

5. The apparatus for automatic extraction of important events in audio signals according to claim 4,
wherein
the emotion classes include a class for each of excited, disappointed, angry, happy and bored.

6. The apparatus for automatic extraction of important events in audio signals according to claim 3,
wherein
the third set of acoustic characteristics used for emotion recognition include prosodic features including one or more of pitch, pitch range, intonation attitude, loudness, speaking rate, or phone duration.

7. The apparatus for automatic extraction of important events in audio signals according to claim 3,
wherein
the third set of acoustic characteristics used for emotion recognition include quality features including one or more of phonation type, articulatory manner, voice timbre, spectral tilt, difference of amplitude between harmonics and formants, formants bandwidth, jitter, or harmonic-to-noise ratio.

8. The apparatus for automatic extraction of important events in audio signals according to claim 1,
further comprising:
a signal output processing circuit configured to generate an output file,
wherein the output file includes the Electronic Program Guide signals, the audio signals, and the video signals supplied to the signal input processing circuit.

9. A method for automatic extraction of important events in audio signals executed by an automatic audio extraction apparatus, the method comprising:
supplying Electronic Program Guide signals, audio signals, and video signals that correspond to the audio signals;
partitioning, at the automatic audio extraction apparatus, the audio signals into audio fragments of a predetermined length;
allocating, at the automatic audio extraction apparatus, a sequence of one or more audio fragments to a respective audio window of a plurality of audio windows;
providing a classifier database including important event classifying rules, and providing an important event classifying rule for each different category of program, including a news category, a sports category, a movie category, and a document film category, included in the audio signals;
identifying the category of program, from among the news category, the sports category, the movie category, and the document film category, that the audio signals actually belong to using the Electronic Program Guide signals;
choosing a suitable important event classifying rule from the important event classifying rules stored in the classifier database based on the identified category of program, each of the news category, the sports category, the movie category, and the document film category having a different important event classifying rule;
analyzing, at the automatic audio extraction apparatus, acoustic characteristics of the audio signals included in the audio fragments;
analyzing, at the automatic audio extraction apparatus, acoustic characteristics of the audio signals included in the audio windows; and
extracting, at the automatic audio extraction apparatus, important events in audio signals based on the identified category of program and said suitable important event classifying rule by using the acoustic characteristics of the audio signals included in the audio fragments and the acoustic characteristics of the audio signals included in the audio windows, each of the important events includes a discrete sequence of cohesive audio fragments corresponding to an important event included in the audio signals.

10. The method for automatic extraction of important events in audio signals according to claim 9,
further comprising:
detecting a speech signal included in the audio signals of each audio window;
recognising an emotion in said speech signal based on a third set of acoustic characteristics of an audio signal included in said speech signal; and
outputting a corresponding emotion signal, wherein the extracting important events in audio signals is performed by using said emotion signal.

11. The method for automatic extraction of important events in audio signals according to claim 10,
further comprising:
normalising the emotion signal according to predetermined emotion classes.

12. The method for automatic extraction of important events in audio signals according to claim 10,
wherein
the third set of acoustic characteristics used in the recognising an emotion in said speech signal include prosodic features including one or more of pitch, pitch range, intonation attitude, loudness, speaking rate, or phone duration.

13. The method for automatic extraction of important events in audio signals according to claim 10,
wherein
the third set of acoustic characteristics used in the recognising an emotion in said speech signal include quality features including one or more of phonation type, articulatory manner, voice timbre, spectral tilt, difference of amplitude between harmonics and formants, formants bandwidth, jitter, or harmonic-to-noise ratio.

14. A method for automatic generation of important event classifying rules for extraction of important events in audio signals executed by an automatic audio extraction apparatus, the method comprising:
partitioning, at the automatic audio extracting apparatus, audio signals into audio fragments of a predetermined length, the audio signals corresponding to video signals;
allocating, at the automatic audio extracting apparatus, a temporal sequence of one or more audio fragments to a respective audio window of a plurality of audio windows;

tagging, at the automatic audio extracting apparatus, each audio window with a predefined important event label corresponding to a program that is included in the video signals;

extracting, at the automatic audio extracting apparatus, fragment characteristics for the audio fragments of a given window by analyzing acoustic characteristics of the audio signals included in each of the audio fragments of a given window;

extracting, at the automatic audio extracting apparatus, window characteristics for the respective audio window by analyzing acoustic characteristics of the audio signal included in the respective audio window; and generating after said step of extracting window characteristics, at the automatic audio extracting apparatus, an important event classifying rule for the respective important event label by using both the fragment characteristics and the window characteristics, the important event classifying rule being associated with a category of program, including a news category, a sports category, a movie category, and a document film category, that is identified using supplied Electronic Program Guide signals, each of the news category, the sports category, the movie category, and the document film category having a different important event classifying rule.

15. The method for automatic generation of important event classifying rules according to claim 14, further comprising:
detecting a speech signal in the audio signal included in the respective audio window; and
recognising emotion in the speech signal based on prosodic features or quality features of said speech signal,
wherein the generating an important event classifying rule for the respective important event label is performed by using said recognised emotion.

16. The method for automatic generation of important event classifying rules according to claim 15, wherein
the prosodic features include one or more of pitch, pitch range, intonation attitude, loudness, speaking rate, or phone duration; and the quality features include one or more of phonation type, articulatory manner, voice timbre, spectral tilt, difference of amplitude between harmonics and formants, formants bandwidth, jitter, or harmonic-to-noise ratio.

17. A non-transitory computer readable storage medium including stored thereon computer executable instructions, wherein the instructions, when executed by a computer, cause the computer to perform a method according to claim 9.

18. The method for automatic generation of important event classifying rules according to claim 14, wherein
the audio windows are manually tagged with the predefined important event label.

19. The apparatus for automatic extraction of important events in audio signals according to claim 1, wherein
the acoustic characteristics analyzed in the audio signals included in the audio fragments include one or more of zero crossing rate, energy/loudness, sub-band energy rate, mel-cepstral frequency components, frequency centroid, or bandwidth.

20. The apparatus for automatic extraction of important events in audio signals according to claim 1, wherein
the acoustic characteristics analyzed in the audio signals included in the audio windows include one or more of volume standard deviation, volume dynamic range, high zero crossing rate ratio, low short-term energy ratio, or spectral flux.

21. The method for automatic extraction of important events in audio signals according to claim 9, wherein
the analyzing acoustic characteristics in the audio signals included in the audio fragments includes analysis of one or more of zero crossing rate, energy/loudness, sub-band energy rate, mel-cepstral frequency components, frequency centroid, or bandwidth.

22. The method for automatic extraction of important events in audio signals according to claim 9, wherein
the analyzing acoustic characteristics in the audio signals included in the audio windows includes analysis of one or more of volume standard deviation, volume dynamic range, high zero crossing rate ratio, low short-term energy ratio, or spectral flux.

23. The method for automatic generation of important event classifying rules according to claim 14, wherein
the extracting fragment characteristics includes calculation of one or more of a zero cross rate, volume, sub-band energy rate, mel-cepstral frequency components, frequency centroid, or bandwidth of the audio signal comprised in the respective video fragment.

24. The method for automatic generation of important event classifying rules according to claim 14, wherein
the extracting window characteristics includes calculation of one or more of a volume standard deviation, a volume dynamic range, a high zero crossing rate ratio, a low short-term energy ratio, or spectral flux of the audio signal comprised in the respective video window.

25. The apparatus for automatic extraction of important events in audio signals according to claim 1, wherein when the category of program is the sports category, the important events of the audio signals correspond to important sports activities of a sports program, and the sports program is included in the video signals.

26. The apparatus for automatic extraction of important events in audio signals according to claim 1, wherein each of the important event classifying rules includes a plurality of secondary classifying rules.

27. The apparatus for automatic extraction of important events in audio signals according to claim 1, wherein the analyzed acoustic characteristics of the audio signals included in the audio fragments are different from the analyzed acoustic characteristics of the audio signals comprised in the audio windows.

28. The apparatus for automatic extraction of important events in audio signals according to claim 1, wherein a number of audio fragments that the audio signal fragmenting processing circuit partitions the audio signals into is based on the important event classifying rule chosen by the classifier selection processing circuit.

* * * * *